United States Patent
Inoue et al.

(10) Patent No.: US 10,352,393 B2
(45) Date of Patent: Jul. 16, 2019

(54) TORSION DAMPER

(71) Applicant: HONDA MOTOR CO., LTD., Tokyo (JP)

(72) Inventors: Toshio Inoue, Wako (JP); Osamu Terashima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 106 days.

(21) Appl. No.: 15/619,874

(22) Filed: Jun. 12, 2017

(65) Prior Publication Data

US 2017/0363171 A1 Dec. 21, 2017

(30) Foreign Application Priority Data

Jun. 15, 2016 (JP) .................................. 2016-119097

(51) Int. Cl.
| | |
|---|---|
| F16F 15/14 | (2006.01) |
| F16F 15/18 | (2006.01) |
| F16F 15/31 | (2006.01) |
| F16F 9/53 | (2006.01) |
| F16F 1/36 | (2006.01) |

(52) U.S. Cl.
CPC ............. F16F 9/535 (2013.01); F16F 1/361 (2013.01); F16F 15/1442 (2013.01); F16F 15/1485 (2013.01); F16F 15/18 (2013.01); F16F 15/31 (2013.01); F16F 9/53 (2013.01)

(58) Field of Classification Search
CPC .... F16F 1/361; F16F 15/1442; F16F 15/1485; F16F 15/18; F16F 15/31; F16F 9/535
See application file for complete search history.

(56) References Cited

U.S. PATENT DOCUMENTS

| | | | |
|---|---|---|---|
| 6,191,510 B1* | 2/2001 | Landin | H02K 1/04 310/216.016 |
| 7,261,834 B2* | 8/2007 | Fuchs | F16F 1/3605 252/62.53 |
| 2006/0030441 A1 | 2/2006 | Watanabe et al. | |
| 2006/0081086 A1* | 4/2006 | Crist | F16F 1/361 74/574.1 |
| 2007/0200453 A1* | 8/2007 | Heim | H01L 41/0986 310/311 |

(Continued)

FOREIGN PATENT DOCUMENTS

| | | |
|---|---|---|
| CN | 1666034 A | 9/2005 |
| CN | 103129377 A | 6/2013 |

(Continued)

OTHER PUBLICATIONS

EPO Machine Translation of JP 2015045369 (A), Inoue et al., Mar. 12, 2015 (Year: 2015).*

(Continued)

*Primary Examiner* — Vinh Luong
(74) *Attorney, Agent, or Firm* — Rankin, Hill & Clark LLP

(57) ABSTRACT

A craft damper (torsion damper) includes a crankshaft (shaft member) to be input with a torsion vibration, a disc member coaxially attached to the crankshaft, a ring-shaped inertia mass body connected to an outer peripheral side of the disc member via a magneto-rheological elastomer member so as to be coaxial with the crankshaft, and an electromagnetic coil for applying a magnetic field to the magneto-rheological elastomer member.

5 Claims, 7 Drawing Sheets

(56) References Cited

U.S. PATENT DOCUMENTS

| | | | |
|---|---|---|---|
| 2009/0183959 A1* | 7/2009 | Klit | F16F 9/53 188/267.1 |
| 2013/0127098 A1 | 5/2013 | Kim et al. | |
| 2013/0244800 A1 | 9/2013 | Sakai et al. | |
| 2014/0191624 A1* | 7/2014 | Jahshan | H02K 35/02 310/68 B |
| 2015/0211596 A1 | 7/2015 | Battlogg et al. | |
| 2015/0343740 A1* | 12/2015 | Inoue | B32B 7/005 428/114 |
| 2017/0149322 A1* | 5/2017 | Lin | H02K 37/22 |

FOREIGN PATENT DOCUMENTS

| | | | |
|---|---|---|---|
| CN | 103727167 A | | 4/2014 |
| JP | 2012-210937 A | | 11/2012 |
| JP | 2015-45369 | * | 3/2015 |
| JP | 2015-215005 A | * | 12/2015 |
| RU | 2106551 C1 | | 3/1998 |
| WO | 2012066680 A1 | | 5/2012 |

OTHER PUBLICATIONS

English Abstract of JP 2015045369 (A), Inoue et al., Mar. 12, 2015 (Year: 2015).*
EPO Abstract of JP2015215005, Hirai, Dec. 3, 2015 (Year: 2015).*
Chinese Office Action dated Nov. 15, 2018, 9 pages.

* cited by examiner

TORSION DAMPER

CROSS REFERENCE TO RELATED APPLICATIONS

This application claims the foreign priority benefit under Title 35, U.S. Code, § 119 (a)-(d) of Japanese Patent Application No. 2016-119097, filed on Jun. 15, 2016, the disclosure of which is herein incorporated by reference in its entirety.

TECHNICAL FIELD

The present invention relates to a torsion damper.

BACKGROUND ART

Conventionally, there has been known a torsion damper including a disc-shaped inertia body connected to a crankshaft of an engine and rotating around an axis of the crankshaft, and a damper spring interposed between the crankshaft and the inertia body (for example, see Patent Documents 1, 2). Such a torsion damper shows dynamic damping effect by vibrating in opposite phase with respect to torsional vibration to be input (hereinafter, also simply referred to as input vibration) at a resonance frequency (natural frequency) $f_0$ indicated by the following equation.

$$f_0 = \frac{1}{2}\pi\sqrt{(k/m)}$$

where k is a spring constant of a damper spring, and m is a mass of the inertia body

CITATION LIST

Patent Literature

[Patent Document 1]
International Publication No. WO2012/066680
[Patent Document 2]
Japanese Patent Application Publication No. 2012-210937

SUMMARY OF INVENTION

Technical Problem

As described above, a conventional torsion damper (for example, see Patent Documents 1, 2) has a natural resonance frequency $f_0$ determined by a spring constant k of the damper spring and a mass m of the inertia body. However, since a revolution speed (vibration frequency) of the engine fluctuates, a frequency of the input vibration may vary. When the frequency of the input vibration varies in this manner, the torsion damper cannot sufficiently reduce the input vibration.

Therefore, an object of the present invention is to provide a torsion damper excellent in dynamic damping effect even when a vibration frequency fluctuates.

Solution to Problem

In order to solve the above problems, a torsion damper of the present invention includes a shaft member to be input with a torsion vibration, a disc member attached to the shaft member so as to be coaxial with the shaft member, a ring-shaped inertia mass body connected to an outer peripheral side of the disc member via a magneto-rheological elastomer member so as to be coaxial with the shaft member, and an electromagnetic coil for applying a magnetic field to the magneto-rheological elastomer member. In this torsion damper, a spring constant of the magneto-rheological elastomer member is changed by adjusting a magnitude of current flowing through the electromagnetic coil, and thus the resonance frequency (natural frequency) can be adjusted.

Advantageous Effects of Invention

According to the present invention, it is possible to provide a torsion damper excellent in dynamic damping effect even when the vibration frequency fluctuates.

DESCRIPTION OF EMBODIMENTS

Next, embodiments of the present invention will be described. A torsion damper (torsional damper) of the present invention is a variable stiffness dynamic damper for reducing torsional vibration input to a shaft member, and can be applied to various mechanisms for generating torsional vibration. In the present embodiment, the torsion damper of the present invention will be described in detail with reference to a crank damper disposed between an output shaft and a crankshaft of a vehicle engine as an example.

Figure 1:
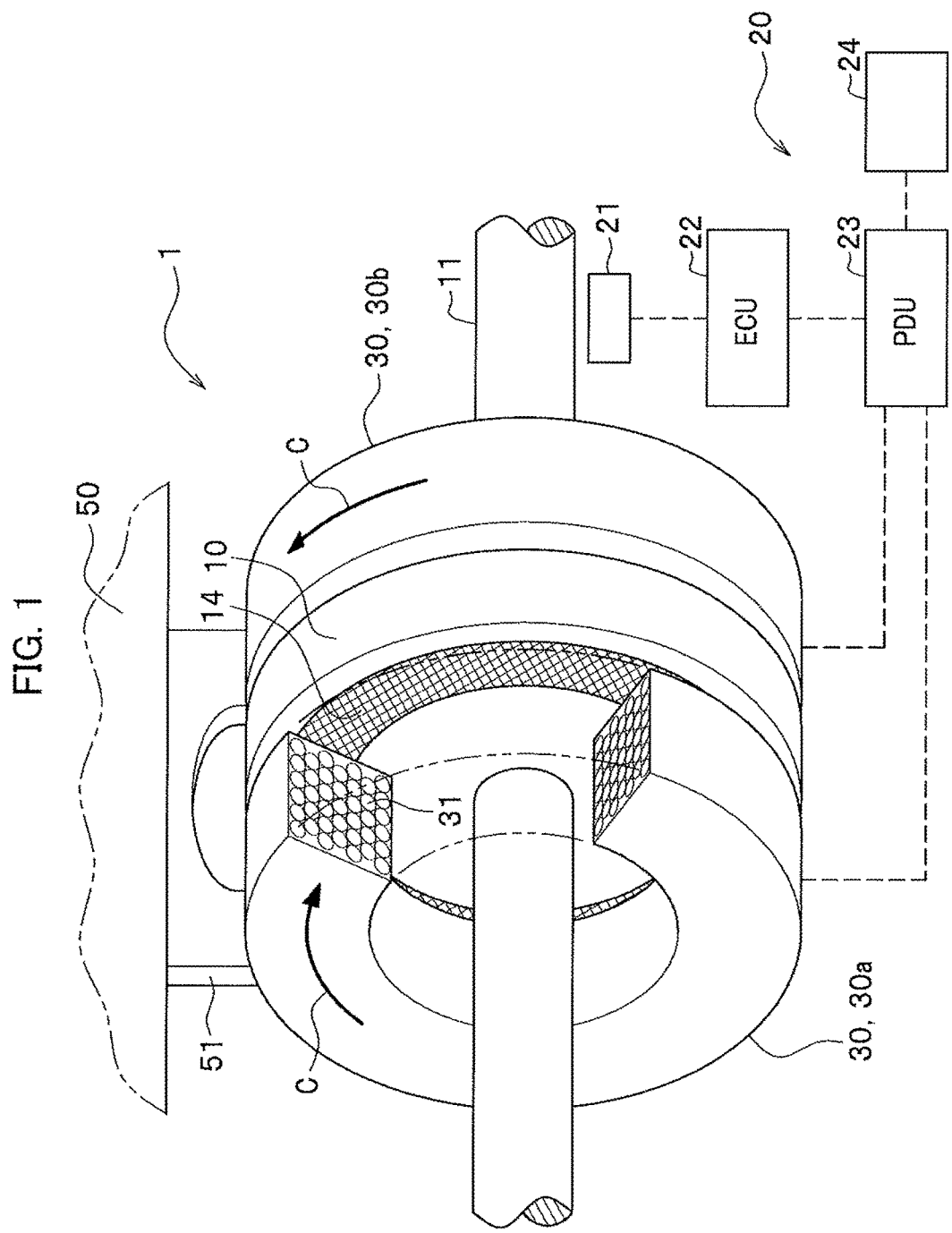
FIG. 1 is a view showing a configuration of a torsion damper (crank damper) according to an embodiment of the present invention.

FIG. 1 is a view showing a configuration of a crank damper 1 according to the present embodiment, and is a view showing the configuration in which an electromagnetic coil 30 is partially cut away. As shown in FIG. 1, the crank damper 1 includes a damper body 10 and a pair of electromagnetic coils 30 composed of a first electromagnetic coil 30a and a second electromagnetic coil 30b, which will be described in detail below. Further, the crank damper 1 includes a spring constant control mechanism 20 for controlling a spring constant of a magneto-rheological elastomer member 14 constituting the damper body 10. In the following description, when it is not necessary to distinguish between the first electromagnetic coil 30a and the second electromagnetic coil 30b, they are simply referred to as the electromagnetic coils 30.

In FIG. 1, reference numeral 51 is a bracket for attaching the electromagnetic coils 30 to a predetermined base 50 (basic structure). Reference numeral 11 is a crankshaft (shaft member) to be input with torsional vibration, and reference numerals C are arrows indicating directions of currents flowing through winding wires 31 constituting the electromagnetic coils 30. An engine speed sensor 21, an ECU (Electronic Control Unit) 22, a PDU (Power Drive Unit) 23 and a battery 24 constituting the spring constant control mechanism 20 will be also described in detail below.

Figure 2:
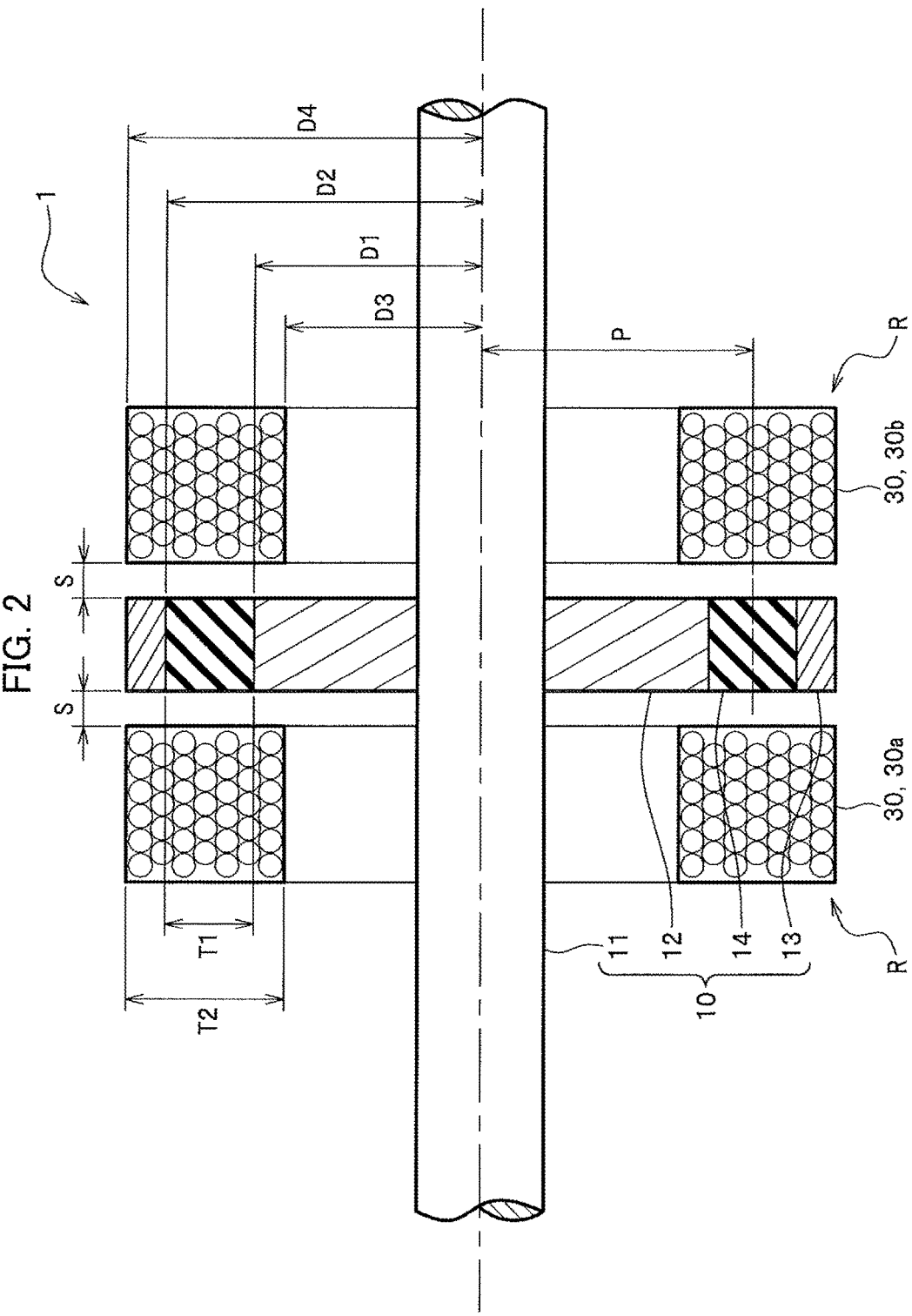
FIG. 2 is a cross-sectional view of the torsion damper (crank damper)
Figure 3:
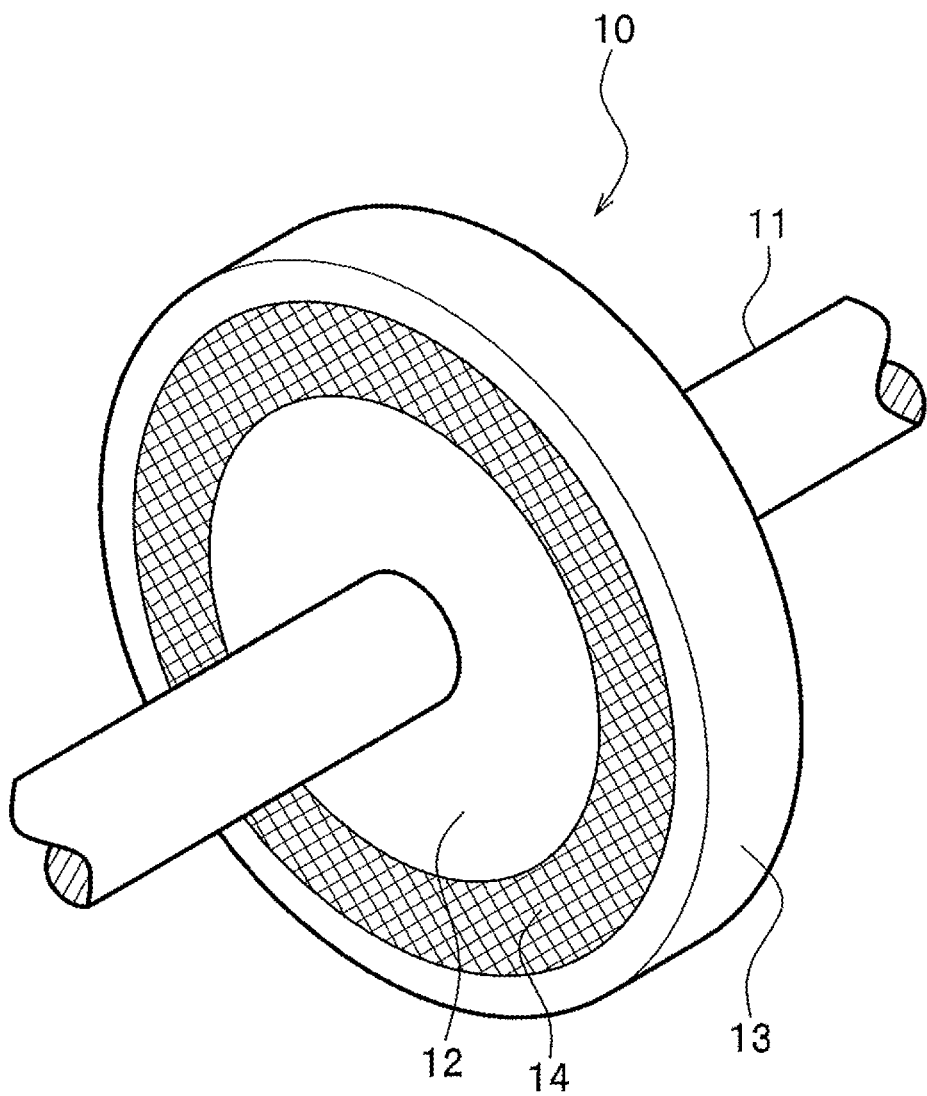
FIG. 3 is a perspective view of a damper body constituting the torsion damper (crank damper)

FIG. 2 is a cross-sectional view of the crank damper 1 in an axial direction of the crank shaft 11 (shaft member). FIG. 3 is a perspective view of the damper body 10 constituting the crank damper 1. As shown in FIGS. 2 and 3, the damper body 10 includes the crank shaft 11 (shaft member), a disc member 12, an inertia mass body 13 and the magneto-rheological elastomer member 14.

Although not shown, the crank shaft 11 is connected to a piston slidably disposed in a cylinder bore of the engine via a connecting rod. Further, the crankshaft 11 is rotatably supported by a crankcase connected to a lower surface of a cylinder block formed with the cylinder bore. The crankshaft 11 extending from the crankcase is shown in FIG. 1. An end portion of the crankshaft 11 on a side opposite to the crankcase is connected to an output shaft of a power transmission system.

The disc member 12 is formed of a thick plate having a circular planar shape. The disc member 12 is coaxially attached to the crankshaft 11 (shaft member). The disc member 12 is fixed to the crankshaft 11 and rotates synchronously with rotation of the crankshaft 11.

The disc member 12 of the present embodiment is assumed to be made of a metal. As this metal, for example, a known metal material for a pulley can be used, but a nonmagnetic metal such as an aluminum alloy or a stainless steel is preferably used. Although a method of fixing the disc member 12 to the crankshaft 11 is not particularly limited, for example, shrink fitting or welding can be used. When the disc member 12 is made of a cutting machinable metal, the disc member 12 can be fixed to the crankshaft 11 also by, for example, serration processing.

The inertia mass body 13 has a ring shape, and is disposed coaxially with the crankshaft 11 (shaft member). The inertia mass body 13 is connected to an outer peripheral side of the disc member 12 via the magneto-rheological elastomer member 14. The inertia mass body 13 forms a mass body on the outer peripheral side of the disc member 12 rotating synchronously with the rotation of the crankshaft 11, to show inertia. That is, the inertia mass body 13 applies inertial force in an opposite direction (in opposite phase) to the disc member 12 to be rotated, via the magneto-rheological elastomer member 14 described below.

As a material of such an inertia mass body 13, for example, the same material as the material of the disc member 12 can be used, but a nonmagnetic material capable of forming the mass body on the outer peripheral side of the disc member 12 is preferably used.

The magneto-rheological elastomer member 14 connects the disc member 12 and the inertia mass body 13 so that the inertia mass body 13 can be disposed on the outer peripheral side of the disc member 12 and coaxially with the crankshaft 11 (shaft member). The magneto-rheological elastomer member 14 is composed of a matrix elastomer having viscoelasticity as a matrix, and magnetic particles contained in the matrix elastomer. As the matrix elastomer, for example, ethylene-propylene rubber, butadiene rubber, isoprene rubber or silicone rubber can be used, however, it is not limited thereto, and known rubbery polymer materials having viscoelasticity at room temperature can be used.

As the magnetic particles, for example, metals such as pure iron, electromagnetic soft iron, directional silicon steel, Mn—Zn ferrite, Ni—Zn ferrite, magnetite, cobalt and nickel, organic compounds such as 4-methoxybenzylidene-4-acetoxyaniline and triaminobenzene polymer, and organic-inorganic composites such as ferrite-dispersed anisotropic plastic can be used, however, they are not limited thereto, and particles made of a known material which is magnetically polarized by action of a magnetic field can be used.

Shape of the magnetic particles is not particularly limited, and it may be, for example, a spherical shape, a needle shape or a flat plate shape. Although particle diameter of the magnetic particles is not particularly limited, an average particle diameter thereof is preferably about 0.01 μm to 500 μm, for example, by particle size distribution measurement by laser diffraction/scattering method.

Although rate of the magnetic particles in the magneto-rheological elastomer member 14 can be arbitrarily set, it is preferably about 5% to 70% by volume fraction. Although rate of the matrix elastomer in the magneto-rheological elastomer member 14 can be arbitrarily set, it is preferably about 30% to 95% by volume fraction.

In the magneto-rheological elastomer member 14, when the magnetic field is not applied by the electromagnetic coils 30 described below, an interaction between the magnetic particles contained in the matrix elastomer is small. When the magnetic field is applied by the electromagnetic coils 30, the magnetic particles contained in the matrix elastomer tend to be oriented along magnetic field lines. Thus, shear stress in a plane perpendicular to the magnetic field line changes. In particular, as magnetic field strength H (A/m) increases, the shear stress increases by the interaction between the magnetic particles. A change in the spring constant of the magneto-rheological elastomer member 14 due to the shear stress will be described in detail below.

Figure 4A:
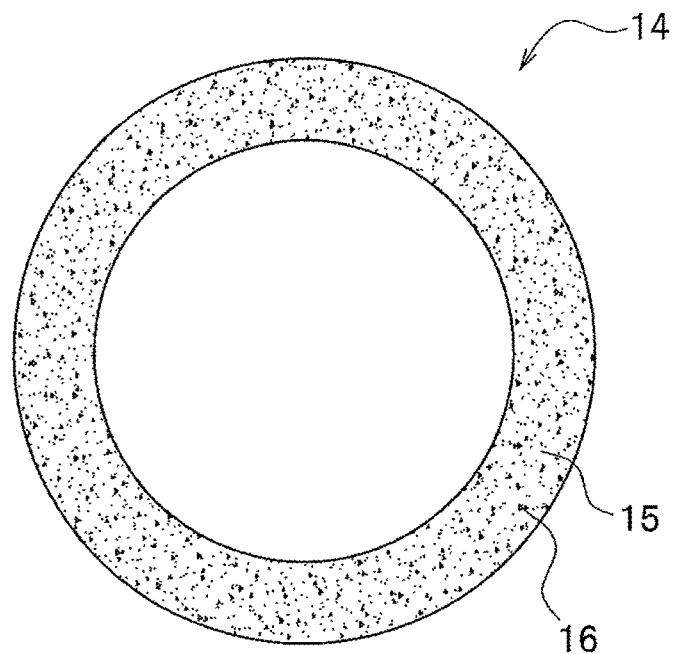
FIG. 4A is a schematic cross-sectional view showing an aspect of a magneto-rheological elastomer member constituting the damper body, and is a cross-sectional view of a magnetic particle dispersed type magneto-rheological elastomer member.
Figure 4B:
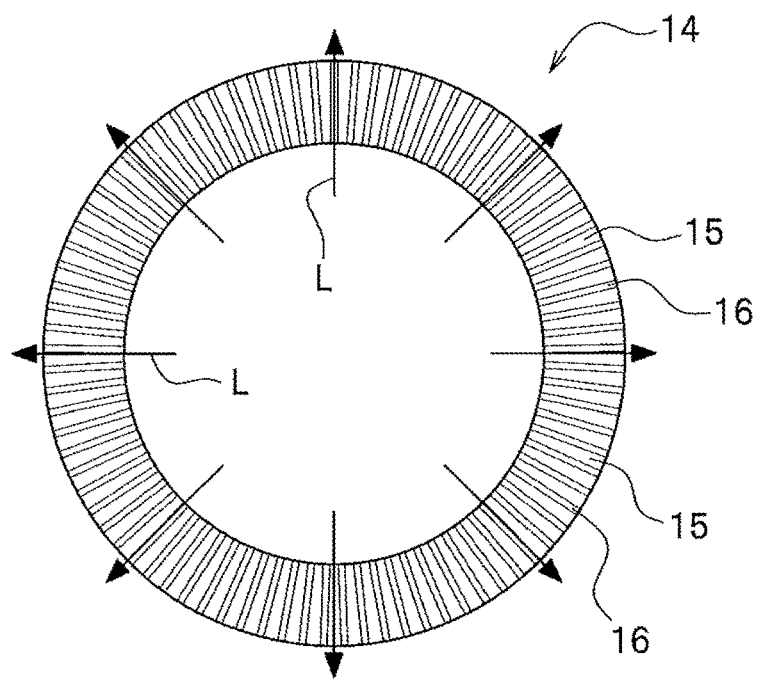
FIG. 4B is a schematic cross-sectional view showing an aspect of a magneto-rheological elastomer member constituting the damper body, and is a cross-sectional view of a magnetic particle oriented type magneto-rheological elastomer member.

FIGS. 4A, 4B are schematic cross-sectional views showing aspects of the magneto-rheological elastomer member 14, FIG. 4A is a cross-sectional view of a magnetic particle dispersed type magneto-rheological elastomer member 14, and FIG. 4B is a cross-sectional view of a magnetic particle oriented type magneto-rheological elastomer member 14. As shown in FIG. 4A, the magneto-rheological elastomer member 14 of the present embodiment is assumed to be a magnetic particle dispersed type in which magnetic particles 16 are randomly dispersed in a matrix elastomer 15.

Instead of the magnetic particle dispersed type magneto-rheological elastomer member 14, the magnetic particle oriented type can also be used. As shown in FIG. 4B, in the magnetic particle oriented type magneto-rheological elastomer member 14, the magnetic particles 16 are oriented in a predetermined direction. In particular, the magnetic particles 16 are distributed in advance in the matrix elastomer 15 so as to follow magnetic field lines L when the magnetic field is applied by the electromagnetic coils 30 described below. Incidentally, the magneto-rheological elastomer member 14 shown in FIG. 4B has a ring shape in which the magnetic particles 16 are oriented in a radial direction thereof. FIG.

4B schematically shows how the magnetic particles 16 are oriented, for convenience of drawing, and is different from an actual one.

In this magnetic particle oriented type magneto-rheological elastomer member 14, when the magnetic field is applied thereto, the interaction between the magnetic particles is stronger than that in the magnetic particle dispersed type magneto-rheological elastomer member 14 (see FIG. 4A), and the shear stress in the plane perpendicular to the magnetic field line L is larger than that in the magnetic particle dispersed type magneto-rheological elastomer member 14. That is, change rate of the spring constant of the magneto-rheological elastomer member 14 to the current (current value) applied to the electromagnetic coils 30 described below increases.

The magneto-rheological elastomer member 14 connects the disc member 12 and the inertia mass body 13 by vulcanization bonding. Incidentally, the vulcanization bonding between the disc member 12 and the inertia mass body 13 is performed by injecting a raw material of the magneto-rheological elastomer member 14 containing a crosslinking agent (vulcanizing agent) into a predetermined mold in which the disc member 12 and the inertia mass body 13 are arranged, and by allowing crosslinking reaction of the raw material to proceed.

The crosslinking agent (vulcanizing agent), heating temperature and the like for allowing the crosslinking reaction to proceed can be selected from known conditions depending on a type of the matrix elastomer to be selected. The magnetic particle oriented type magneto-rheological elastomer member 14 shown in FIG. 4B can be obtained by allowing the crosslinking reaction to proceed while the magnetic particles 16 contained in the raw material are oriented in a direction in a predetermined magnetic field.

Next, the electromagnetic coil 30 will be described. As shown in FIGS. 1 and 2, the electromagnetic coil 30 of the present embodiment is composed of the first electromagnetic coil 30a and the second electromagnetic coil 30b. The first electromagnetic coil 30a and the second electromagnetic coil 30b are arranged so as to sandwich the magneto-rheological elastomer member 14 in the axial direction of the crankshaft 11 (shaft member). The first electromagnetic coil 30a and the second electromagnetic coil 30b are configured to apply the magnetic field to the magneto-rheological elastomer member 14 (see FIG. 1).

As shown in FIG. 2, each of the first electromagnetic coil 30a and the second electromagnetic coil 30b forms a ring body R. These ring bodies R are formed by winding wires 31 (see FIG. 1) around the crankshaft 11 (shaft member). The ring bodies R have the same outer diameter, the same inner diameter and the same thickness in the axial direction with each other. In other words, the number of turns and wire diameter of the first electromagnetic coil 30a are substantially the same as those of the second electromagnetic coil 30b.

The currents (numeral references C, C in FIG. 1) opposite to each other in a circumferential direction flow respectively through the winding wires 31 of the first electromagnetic coil 30a and the second electromagnetic coil 30b.

As shown in FIG. 2, each of the ring bodies R is disposed at a predetermined distance S in the axial direction of the crankshaft 11 (shaft member) with respect to the magneto-rheological elastomer member 14. That is, each of the first electromagnetic coil 30a and the second electromagnetic coil 30b is attached to the bracket 51 (see FIG. 1) and positioned to be disposed at the predetermined distance S as described above.

The base 50 (see FIG. 1) provided with the bracket 51 (see FIG. 1) is not particularly limited as long as it is a vehicle structural member formed independently from and close to the damper body 10. The distance S is preferably set so that the first electromagnetic coil 30a and the second electromagnetic coil 30b do not contact the damper body 10 but come closest thereto.

Each of the ring bodies R is disposed side by side in the axial direction of the crankshaft 11 (shaft member) with respect to the magneto-rheological elastomer member 14. Since a central axis of the ring body R and a central axis of the magneto-rheological elastomer member 14 are arranged coaxially, it is preferred that the following equation (1) is satisfied for an inner diameter D1 and an outer diameter D2 of the magneto-rheological elastomer member 14 and an inner diameter D3 and an outer diameter D4 of the ring body R.

$$D1+D2=D3+D4 \qquad \text{Equation (1)}$$

With the ring body R and the magneto-rheological elastomer member 14 satisfying the equation (1), a distance P from an axial center of the crankshaft 11 to a thickness center of the ring body R and a distance P from the axial center of the crankshaft 11 to a thickness center of the magneto-rheological elastomer member 14 are equal to each other.

The following equation (2) is preferably satisfied for a thickness T1 in the radial direction of the magneto-rheological elastomer member 14 and a thickness T2 in the radial direction of the ring body R.

$$T2>T1 \qquad \text{Equation (2)}$$

That is, the following equation (3) is satisfied.

$$D4-D3>D2-D1 \qquad \text{Equation (3)}$$

In the equation (3), D1, D2, D3 and D4 have the same meanings as described above, and T2=D4−D3, T1=D2−D1.

Next, the spring constant control mechanism 20 shown in FIG. 1 will be described. The spring constant control mechanism 20 changes the spring constant of the magneto-rheological elastomer member 14 in the damper body 10 depending on a change in frequency of torsional vibration (input vibration) input to the crankshaft 11. As shown in FIG. 1, the spring constant control mechanism 20 of the present embodiment includes the engine speed sensor 21, the ECU 22, the PDU 23 and the battery 24.

The engine speed sensor 21 of the present embodiment is assumed to detect a rotational speed of the crankshaft 11 magnetically or optically, however, it is not particularly limited thereto as long as it can detect a revolution speed of the engine.

The ECU 22 is an electronic unit including a CPU (Central Processing Unit), a memory and the like. The ECU 22 executes a control program stored in a storage unit such as a memory by the CPU.

The ECU 22 detects an engine revolution speed by the engine speed sensor 21. Further, the ECU 22 identifies the frequency of the input vibration to the crankshaft 11 based on the detected engine revolution speed. The frequency is identified by the CPU referring a memory stored with a map showing a relationship, which is obtained in advance, between an engine revolution speed $R_x$ (variable) and a frequency $f_y$ (variable) of the input vibration to the crankshaft 11.

The ECU 22 defines specifications (a mass m of the inertia mass body 13 and a spring constant k of the magneto-rheological elastomer member 14) of the damper body 10 based on the identified frequency. That is, the spring constant k of the magneto-rheological elastomer member 14 for dynamically damping torsional vibration is calculated from an equation "$f_0=\frac{1}{2}\pi\sqrt{(k/m)}$" based on the identified frequency $f_0$ of the input vibration and the mass m (constant value) of the inertia mass body 13.

The ECU 22 calculates the current value, which is required to set the spring constant k to the calculated value and is applied to the first electromagnetic coil 30a and the second electromagnetic coil 30b. The current value is calculated by the CPU referring a memory stored with a map showing a relationship, which is obtained in advance, between a spring constant $k_x$ (variable) of the magneto-rheological elastomer member 14 and a current value $I_y$ (variable) to be applied to the first electromagnetic coil 30a and the second electromagnetic coil 30b.

The map referred by the ECU 22 is not limited thereto as long as it can calculate the current value to be applied to the first electromagnetic coil 30a and the second electromagnetic coil 30b based on the engine revolution speed.

Figure 5:
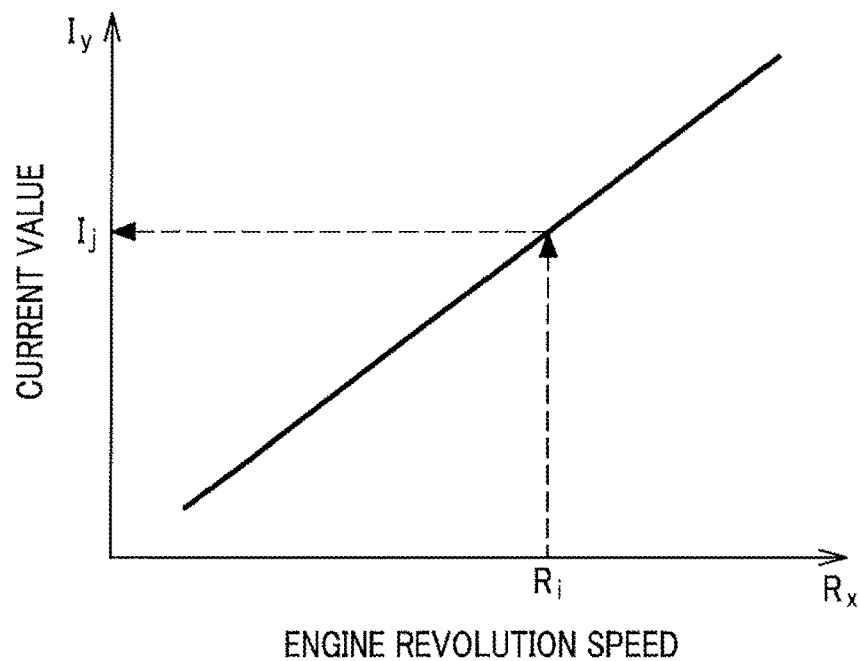
FIG. 5 is a graph showing an example of a table stored in a memory of a control unit constituting the torsion damper (crank damper)

FIG. 5 is a graph showing an example of the map stored in the memory of the control unit (ECU 22) constituting the crank damper 1 according to the present embodiment. As shown in FIG. 5, the map shows the relationship, which is obtained in advance, between the engine revolution speed $R_x$ (variable) and the current value $I_y$ (variable) to be applied to the first electromagnetic coil 30a and the second electromagnetic coil 30b, without showing the relationship between the current value $I_y$ and the spring constant $k_x$ of the magneto-rheological elastomer member 14. An input response speed of the spring constant control mechanism 20 is increased by using this map.

When the ECU 22 controls an ignition timing of the engine, the ECU 22 can also calculate the frequency of the input vibration to the crankshaft 11 based on the ignition timing without using the engine speed sensor 21.

The PDU 23 is composed of an electric circuit including an inverter and the like. The PDU 23 supplies power from the battery 24 to the first electromagnetic coil 30a and the second electromagnetic coil 30b at the predetermined current value in response to a command from the ECU 22.

Figure 6:
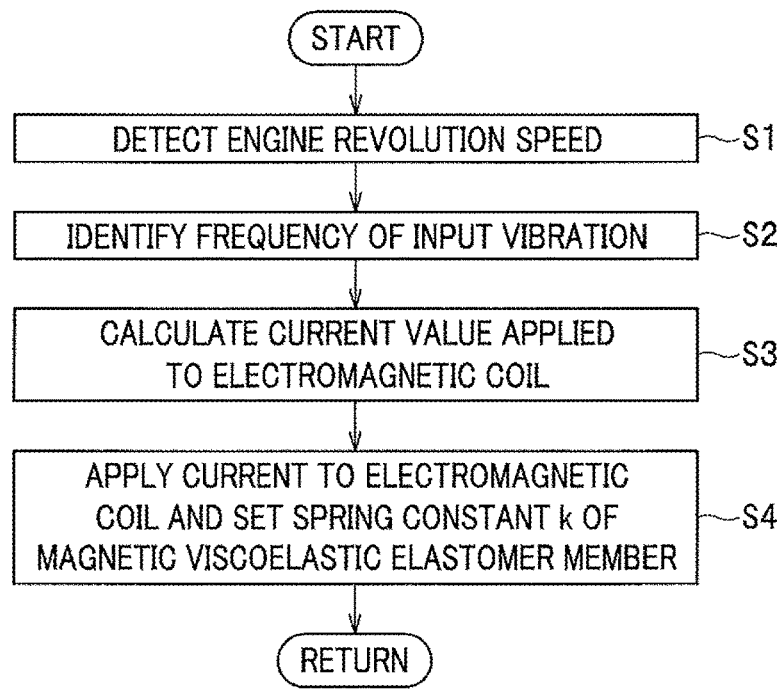
FIG. 6 is a flowchart illustrating an operation of the torsion damper (crank damper)

Next, operation and effect of the craft damper 1 of the present embodiment will be described. FIG. 6 is a flowchart illustrating the operation of the crank damper 1. In the crank damper 1 (see FIG. 1) of the present embodiment, the ECU 22 (see FIG. 1) detects the engine revolution speed based on a detection signal from the engine speed sensor 21 (see FIG. 1) as the engine is started (Step S1 in FIG. 6).

The crank damper 1 identifies the frequency of the input vibration to the crankshaft 11 (see FIG. 1) based on a detected value of the engine revolution speed (see Step S2 in FIG. 6). The ECU 22 calculates the spring constant k of the magneto-rheological elastomer member 14 for dynamically damping the input vibration as described above.

Next, the ECU 22 calculates the current value (see Step S3 in FIG. 6), which is required to set the spring constant k of the magneto-rheological elastomer member 14 to the calculated value and is applied to the electromagnetic coils 30 (see FIG. 1). Then, the ECU 22 commands the PDU 23 to apply this current value to the first electromagnetic coil 30a and the second electromagnetic coil 30b.

The PDU 23 applies the current value to the electromagnetic coils 30 using the battery 24 as a power source to form the magnetic field based on the command from the ECU 22. Thus, the spring constant k of the magneto-rheological elastomer member 14 is set (see Step S4 in FIG. 6).

Figure 7:
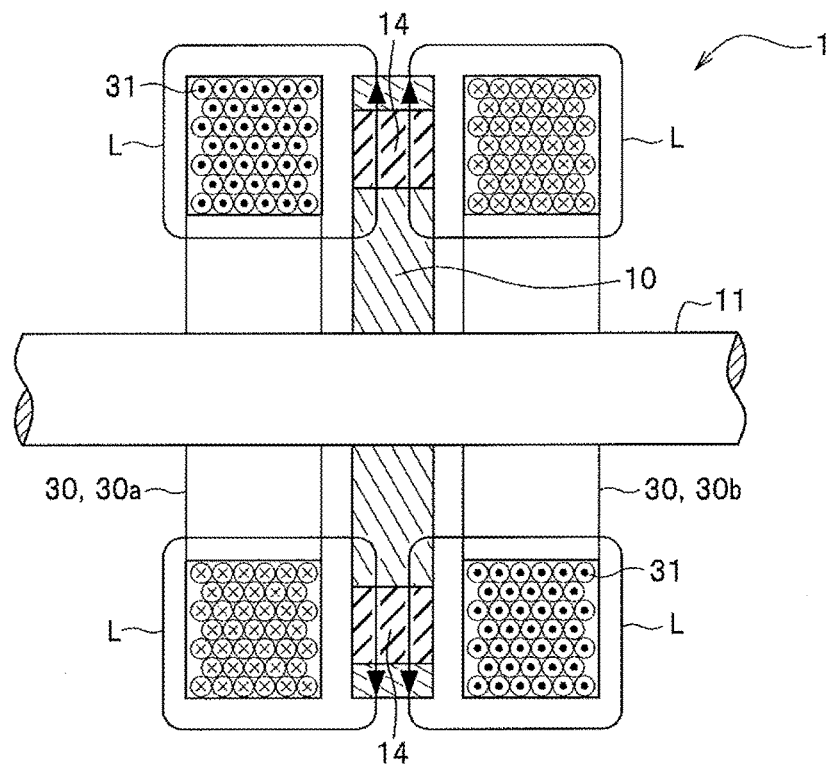
FIG. 7 is a view illustrating the operation of the torsion damper (crank damper) when a magnetic field is formed.

FIG. 7 is a view illustrating the operation of the crank damper 1 and showing how the magnetic field is formed when the predetermined current value is applied to the electromagnetic coil 30. Reference numerals L indicate the magnetic field lines.

The currents are applied to the first electromagnetic coil 30a and the second electromagnetic coil 30b respectively in arrow directions of FIG. 1. In FIG. 7, Marks "·" attached to the winding wires 31 indicate that the current flows from a back side of a paper of FIG. 7 to a front side thereof, and marks "×" indicate that the current flows from the front side of the paper of FIG. 7 to the back side thereof.

As shown in FIG. 7, when the currents are respectively applied to the first electromagnetic coil 30a and the second electromagnetic coil 30b as described above, the magnetic field is formed, so that the magnetic field lines L are formed in a direction from a radially inner side to a radially outer side of the ring-shaped magneto-rheological elastomer member 14. Incidentally, when the currents are respectively applied to the first electromagnetic coil 30a and the second electromagnetic coil 30b in opposite directions to the arrow directions of FIG. 1, the magnetic field lines L are formed in a direction from the radially outer side to the radially inner side of the ring-shaped magneto-rheological elastomer member 14.

When the vibration is input to the crankshaft 11 and the shear stress is generated in the plane perpendicular to the magnetic field lines in the magneto-rheological elastomer member 14, the spring constant k of the magneto-rheological elastomer member 14 is set to a value corresponding to the frequency of the input vibration as described above. Further, the inertia mass body 13 (see FIG. 2) dynamically damps the input vibration by vibrating around the crankshaft 11 in opposite phase to the input vibration via the magneto-rheological elastomer member 14.

According to the crank damper 1 of the present embodiment described above, it is possible to adjust the spring constant k of the magneto-rheological elastomer member 14 in the damper body 10 based on the frequency of the input vibration to the crankshaft 11. Therefore, according to this crank damper 1, it is possible to obtain excellent dynamic damping effect for the input vibration to the crankshaft 11, even when the engine revolution speed (vibration frequency) fluctuates.

Further, unlike the crank damper 1 of the present embodiment, it is also possible to provide plural crank dampers 1 having spring constants different from each other on the crankshaft 11 in order to obtain dynamic damping effect depending on fluctuating frequency of the input vibration. However, when the plural crank dampers 1 are provided on the crankshaft 11 in this manner, new problems such as an interference with peripheral members of the crank damper 1 and increased fuel consumption due to an increase in moment of inertia around the crankshaft 11 occur. In contrast, in the crank damper 1 of the present embodiment, since the spring constant k of the magneto-rheological elastomer member 14 is variable, it is possible to obtain dynamic damping effect depending on fluctuating frequency of the input vibration by a single crank damper 1 provided on the crankshaft 11. Therefore, according to the crank damper 1 of the present embodiment, it is possible to avoid the interference with the peripheral members and the increase in moment of inertia around the crankshaft 11.

In the crank damper 1 of the present embodiment, the electromagnetic coils 30 are the ring bodies R formed by winding the winding wires 31 around the crankshaft 11. The ring bodies R are arranged side by side at the predetermined distance S in the axial direction of the crankshaft 11 with respect to the magneto-rheological elastomer member 14. Thus, the electromagnetic coil 30 forms the magnetic field so as to generate the magnetic field lines L in the radial direction of the magneto-rheological elastomer member 14 as described above. The spring constant k of the magneto-rheological elastomer member 14 appropriately changes depending on the input vibration by this magnetic field, and thus it is possible to dynamically damping the input vibration in an efficient way by the inertia mass body 13 disposed outside the magneto-rheological elastomer member 14.

In the crank damper 1 of the present embodiment, the first electromagnetic coil 30a and the second electromagnetic coil 30b are arranged so as to sandwich the magneto-rheological elastomer member 14 in the axial direction of the crankshaft 11. Thus, the crank damper 1 can apply stronger magnetic field to the magneto-rheological elastomer member 14.

In the crank damper 1 of the present embodiment, the winding wire 31 of the first electromagnetic coil 30a and the winding wire 31 of the second electromagnetic coil 30b are configured such that the currents opposite to each other in the circumferential direction flow respectively therethrough (see FIG. 7). Thus, as shown in FIG. 7, the first electromagnetic coil 30a and the second electromagnetic coil 30b form the magnetic field lines L in a radially outward direction in the magneto-rheological elastomer member 14. According to this craft damper 1, it is possible to avoid mutual cancellation between the magnetic fields formed by the first electromagnetic coil 30a and the second electromagnetic coil 30b, thereby forming stronger magnetic field in the magneto-rheological elastomer member 14.

In the crank damper 1 of the present embodiment, it is preferred that the inner diameter D1 and the outer diameter D2 of the magneto-rheological elastomer member 14 and the inner diameter D3 and the outer diameter D4 of the ring body R are set to satisfy the following equation (1).

$$D1+D2=D3+D4 \qquad \text{Equation (1)}$$

In this craft damper 1, the magneto-rheological elastomer member 14 and the electromagnetic coil 30, which are arranged side by side, face each other. Thus, craft damper 1 can form stronger magnetic field in the magneto-rheological elastomer member 14.

In the crank damper 1 of the present embodiment, the following equation (2) is preferably satisfied for the thickness T1 in the radial direction of the magneto-rheological elastomer member 14 and the thickness T2 in the radial direction of the ring body R.

$$T2>T1 \qquad \text{Equation (2)}$$

That is, the following equation (3) is satisfied.

$$D4-D3>D2-D1 \qquad \text{Equation (3)}$$

In the equation (3), D1, D2, D3 and D4 have the same meanings as described above. This craft damper 1 can form the magnetic field lines L more linearly in the radial direction of the magneto-rheological elastomer member 14 as compared with a craft damper in which the thickness T2 in the radial direction of the ring body R is less than or equal to the thickness T1 in the radial direction of the magneto-rheological elastomer member 14.

In the crank damper 1 of the present embodiment, the central axis of the ring body R and the central axis of the magneto-rheological elastomer member 14 are arranged coaxially. According to this crank damper 1, even when the magneto-rheological elastomer member 14 rotates around the crankshaft 11 with respect to the stationary electromagnetic coils 30, the electromagnetic coils 30 can accurately apply the magnetic field.

As a result, according to the present embodiment, even when the vibration frequency fluctuates, it is possible to provide the craft damper 1 (torsion damper) excellent in dynamic damping effect.

Figure 8:
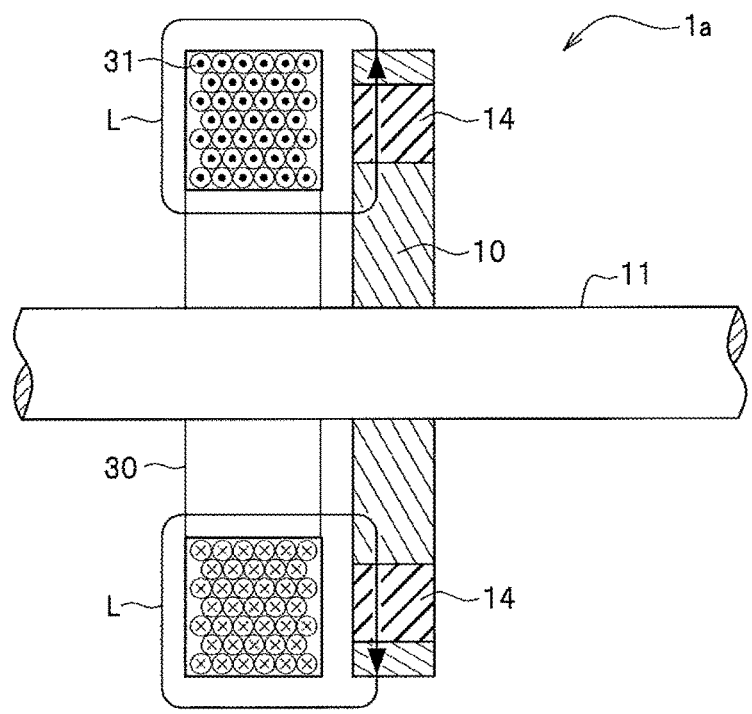
FIG. 8 is a cross-sectional view of a torsion damper (crank damper) according to a first modification.
Figure 9:
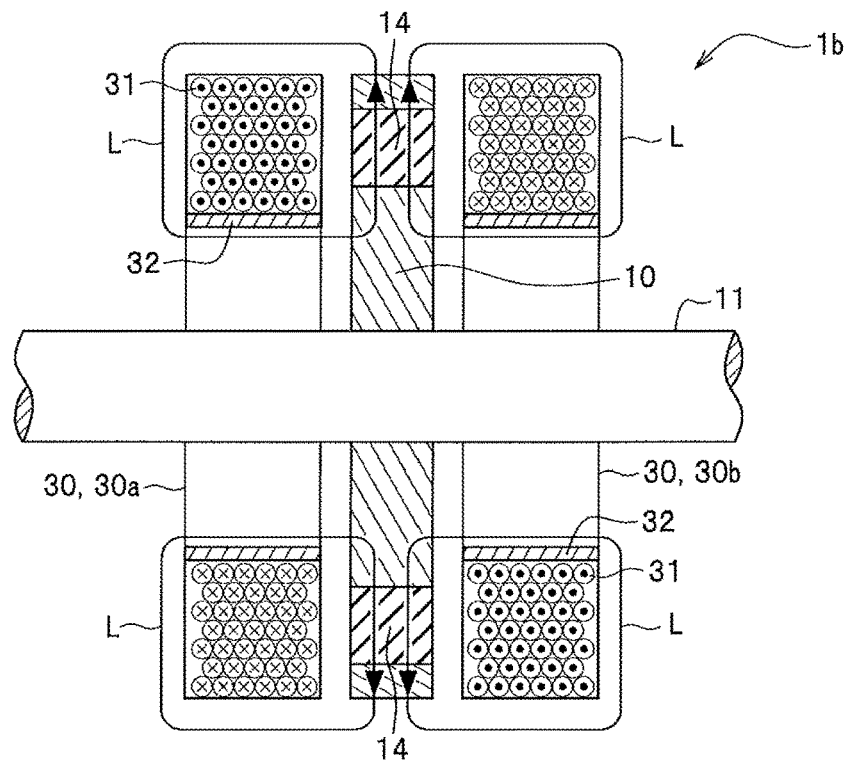
FIG. 9 is a cross-sectional view of a torsion damper (crank damper) according to a second modification.
Figure 10:
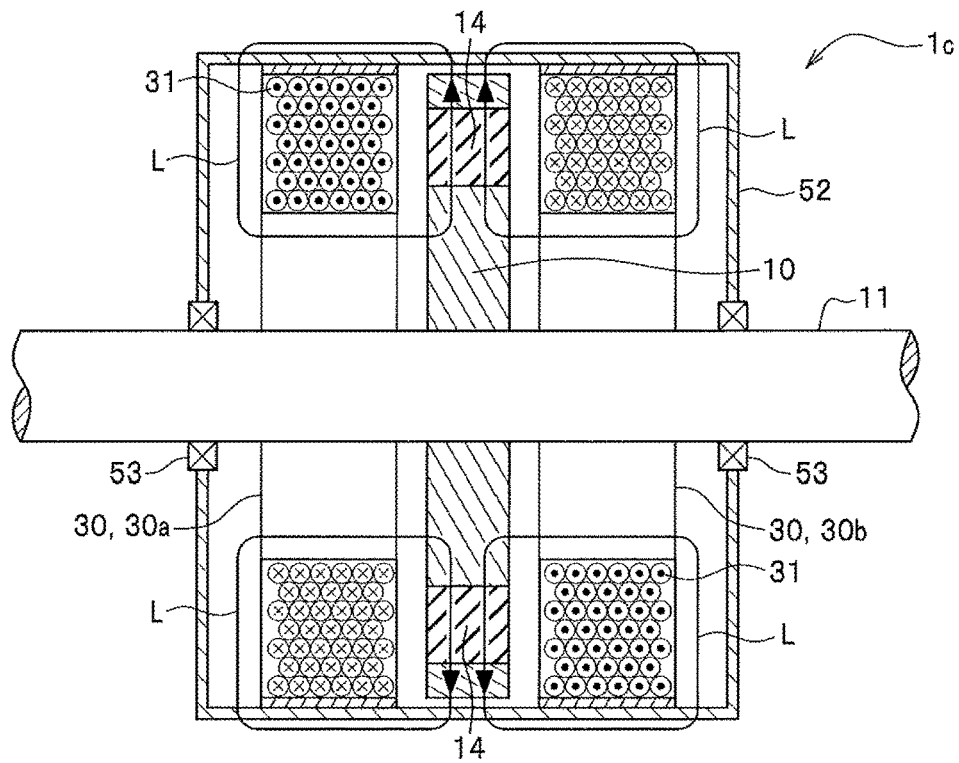
FIG. 10 is a cross-sectional view of a torsion damper (crank damper) according to a third modification.

Hereinabove, the embodiment of the present invention has been described, however, the present invention is not limited to the above-described embodiment, but can be variously modified without departing the spirit and scope of the present invention. FIG. 8 is a cross-sectional view of a crank damper 1a according to a first modification of the embodiment, FIG. 9 is a cross-sectional view of a crank damper 1b according to a second modification of the embodiment, and FIG. 10 is a cross-sectional view of a crank damper 1c according to a third modification of the embodiment. In the crank dampers 1a, 1b, 1c according to the first to third modifications, the same components as those of the embodiment are denoted by the same reference numerals, and a detailed description thereof will be omitted.

As shown in FIG. 8, the crank damper 1a according to the first modification includes only one electromagnetic coil 30. According to this crank damper 1a, it is possible to achieve compactness of a dynamic damper by reducing the number of parts.

As shown in FIG. 9, the crank damper 1b according to the second modification is configured with the electromagnetic coil 30 in which the winding wire 31 is wound around a bobbin 32. According to this crank damper 1b, the electromagnetic coil 30 is excellent in shape stability, and thus it is possible to precisely and easily position the electromagnetic coil 30 with respect to the magneto-rheological elastomer member 14.

As shown in FIG. 10, in the crank damper 1c according to the third modification, the electromagnetic coil 30 is supported in a casing 52 and the crankshaft 11 is supported by the casing 52 via a bearing 53. According to this crank damper 1c, it is possible to precisely and easily position the electromagnetic coil 30 with respect to the magneto-rheological elastomer member 14, and to prevent foreign matter from contacting the magneto-rheological elastomer member 14 and the electromagnetic coil 30. As a material of the casing 52, a non-magnetic material is preferably used.

In the above-described embodiments, although the crank dampers 1, 1a, 1b, 1c have been described, the torsion damper of the present invention can be applied to various mechanisms to be input with torsional vibration. Further, in the above-described embodiments, although the crankshaft 11 as the shaft member of the crank dampers 1, 1a, 1b, 1c rotates synchronously with rotation of the engine, the torsion damper of the present invention can also be used to reduce torsional vibration input to the shaft member that does not rotate.

REFERENCE SIGNS LIST 1 crank damper
1a crank damper
1b crank damper
1c crank damper
10: damper body
11: crankshaft
12: disc member
13: inertia mass body
14: magneto-rheological elastomer member
15: matrix elastomer 16: magnetic particle
20: spring constant control mechanism
21: engine speed sensor
22: ECU
23: PDU
24: battery
30: electromagnetic coil
30a: first electromagnetic coil
30b: second electromagnetic coil
31: winding wire
32: bobbin
50: base
51: bracket
52: casing
L: magnetic field line

The invention claimed is:

1. A torsion damper comprising:
a shaft member to be input with a torsion vibration;
a disc member attached to the shaft member so as to be coaxial with the shaft member;
a ring-shaped inertia mass body connected to an outer peripheral side of the disc member via a magneto-rheological elastomer member so as to be coaxial with the shaft member; and
an electromagnetic coil for applying a magnetic field to the magneto-rheological elastomer member,
wherein the electromagnetic coil is a ring body formed by winding a winding wire around the shaft member, and the ring body is disposed side by side at a predetermined distance in an axial direction of the shaft member with respect to the magneto-rheological elastomer member, and
wherein a first electromagnetic coil and a second electromagnetic coil are arranged so as to sandwich the magneto-rheological elastomer member in the axial direction of the shaft member.

2. The torsion damper according to claim 1, wherein the winding wire of the first electromagnetic coil and the winding wire of the second electromagnetic coil are configured such that currents opposite to each other in a circumferential direction flow respectively therethrough.

3. The torsion damper according to claim 1, wherein a thickness in a radial direction of the ring body is thicker than that in the radial direction of the magneto-rheological elastomer member.

4. The torsion damper according to claim 3, wherein a central axis of the ring body and a central axis of the magneto-rheological elastomer member are arranged coaxially.

5. A torsion damper comprising:
a shaft member to be input with a torsion vibration;
a disc member attached to the shaft member so as to be coaxial with the shaft member;
a ring-shaped inertia mass body connected to an outer peripheral side of the disc member via a magneto-rheological elastomer member so as to be coaxial with the shaft member; and
an electromagnetic coil for applying a magnetic field to the magneto-rheological elastomer member,
wherein the electromagnetic coil is formed by winding a winding wire around the shaft member, and
wherein a first electromagnetic coil and a second electromagnetic coil are arranged so as to sandwich the magneto-rheological elastomer member in the axial direction of the shaft member.

* * * * *